United States Patent
Rai et al.

(10) Patent No.: US 10,552,564 B1
(45) Date of Patent: Feb. 4, 2020

(54) DETERMINING WORST POTENTIAL FAILURE INSTANCES USING FULL CHIP ESD ANALYSIS

(71) Applicant: Cadence Design Systems, Inc., San Jose, CA (US)

(72) Inventors: Nityanand Rai, Noida (IN); Zhiyu Zeng, Austin, TX (US); Xin Gu, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/012,694

(22) Filed: Jun. 19, 2018

(51) Int. Cl.
*G06F 17/50* (2006.01)

(52) U.S. Cl.
CPC ...... *G06F 17/5068* (2013.01); *G06F 2217/78* (2013.01)

(58) Field of Classification Search
CPC .................................................. G06F 17/5068
See application file for complete search history.

(56) References Cited

U.S. PATENT DOCUMENTS

| | | | | |
|---|---|---|---|---|
| 5,835,327 A * | 11/1998 | Siew | ...................... | G01R 27/18 361/111 |
| 6,415,500 B1 * | 7/2002 | Han | ...................... | B82Y 10/00 29/603.14 |
| 6,804,095 B2 * | 10/2004 | Kunz | .................. | H01L 27/0266 361/111 |
| 6,969,891 B1 * | 11/2005 | Leroux | ................... | H01L 21/84 257/355 |
| 8,079,002 B1 * | 12/2011 | Lo | ....................... | G06F 17/5068 716/102 |
| 8,504,952 B2 * | 8/2013 | Yehezkely | .............. | H01L 23/60 361/56 |
| 9,576,915 B2 * | 2/2017 | Huang | .................... | H01L 23/66 |
| 9,619,604 B1 | 4/2017 | Rai et al. | | |
| 9,916,403 B1 * | 3/2018 | Rai | ..................... | G06F 17/5045 |
| 2004/0027745 A1 * | 2/2004 | Kunz | .................. | H01L 27/0266 361/56 |
| 2004/0243949 A1 * | 12/2004 | Wang | .................. | G06F 17/5036 716/112 |
| 2008/0055133 A1 * | 3/2008 | Chakrabartty | ........ | H03M 3/466 341/143 |
| 2008/0230910 A1 * | 9/2008 | Gospodinova-Daltcheva | ............ | H01L 23/5389 257/753 |
| 2008/0310059 A1 * | 12/2008 | Wu | ..................... | G06F 17/5036 361/56 |
| 2010/0169064 A1 * | 7/2010 | Boselli | ................ | G06F 17/5036 703/14 |
| 2014/0098448 A1 * | 4/2014 | Henderson | .......... | H01L 23/5256 361/56 |

(Continued)

*Primary Examiner* — Stacy Whitmore
(74) *Attorney, Agent, or Firm* — Foley & Lardner LLP (57) ABSTRACT

In general, the present embodiments are directed to designing an electronic system such as an IC, and more particularly to techniques for analyzing a design for potential ESD instance failures. Embodiments allow for efficiently determining a potential ESD violation or non-violation status for a large number of instances, such as all the instances in a full chip design, by performing effective resistance analyses between all the instances and all the bumps and ESD protection devices in the design. These and other embodiments further allow for more detailed effective resistance analyses to be performed for potential failing instances.

19 Claims, 4 Drawing Sheets

(56) References Cited

U.S. PATENT DOCUMENTS

2015/0349522 A1\* 12/2015 Miller .................... H05K 9/006
  361/56
2016/0190673 A1\* 6/2016 Huang .................... H01L 23/66
  333/1

\* cited by examiner

DETERMINING WORST POTENTIAL FAILURE INSTANCES USING FULL CHIP ESD ANALYSIS

TECHNICAL FIELD

The present embodiments relate generally to electronic systems, and more particularly to protecting against electrostatic discharge events in such systems, including protection techniques that can be used to analyze designs of integrated circuits.

BACKGROUND

Electronic design automation (EDA) tools are used to design and analyze electronic systems such as printed circuit boards (PCBs) and integrated circuits (ICs, e.g., application specific integrated circuits (ASICs) or systems on chips (SOCs)). ICs can include many thousands and perhaps millions of circuit elements (e.g., transistors, logic gates, diodes, etc.) and interconnecting wires and busses, as well as power grids for the circuit elements. The circuit elements and wires can be formed on many different layers, with various interconnections (e.g, vias) between layers.

Some EDA tools are configured to attempt to handle the issue of electrostatic discharge ("ESD"). ESD generally relates to the transfer of charge between bodies at different electrical potentials. More particularly in connection with ICs, an ESD event can be caused either by Human touch (e.g., HBM) or during machine testing (e.g., MM/CDM) of the IC. An ESD event may alter the electrical characteristics of a semiconductor device, and may even degrade or destroy the device. Because an ESD event is a high surge current event, it has become a major reliability problem in the semiconductor industry.

Although conventional EDA tools can assist in providing some protection for an IC design against ESD events, further improvements remain desirable.

SUMMARY

In general, the present embodiments are directed to designing an electronic system such as an IC, and more particularly to techniques for analyzing a design for potential ESD instance failures. Embodiments allow for efficiently determining a potential ESD violation or non-violation status for a large number of instances, such as all the instances in a full chip design, by performing shorted effective resistance analyses between all the instances and all the bumps and ESD protection devices in the design. These and other embodiments further allow for more detailed effective resistance analyses to be performed for potential failing instances.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Figure 1:
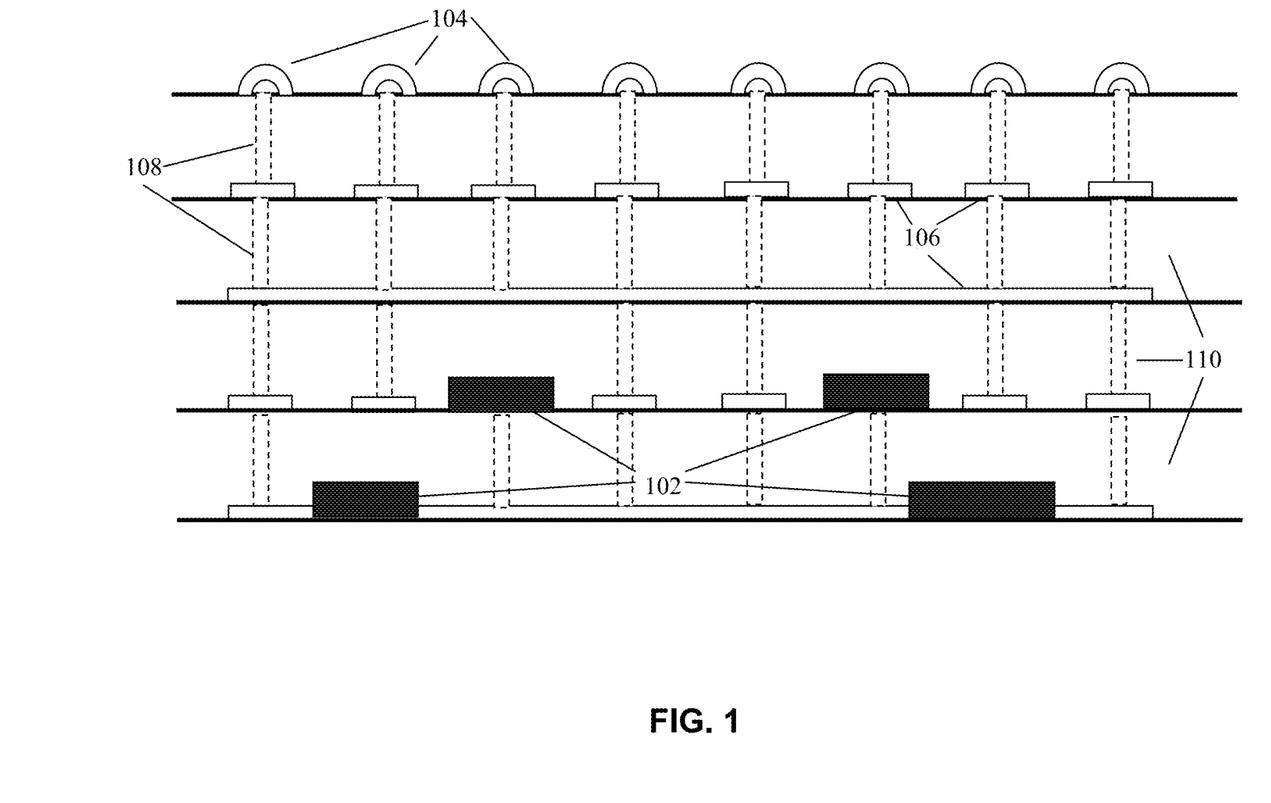
FIG. 1 is a diagram illustrating aspects of protecting against ESD in a design of an IC.

In general, the present embodiments are directed to protecting a design for an electronic system such as an IC, and more particularly to techniques for analyzing a design for potential ESD instance failures. FIG. 1 is a diagram illustrating aspects of protecting against ESD in an example IC design.

Design engineers design ICs by transforming logical or circuit descriptions of the IC's into geometric descriptions, called layouts. IC layouts typically include instances of circuit modules (e.g., electronic or circuit IC components, including ESD protection cells) with signal pins, and interconnections 106 (e.g., geometric representations of signal wiring and vias 108) that connect the signal pins of the circuit modules. Each of these instances or components can comprise one or more shapes 102 on one or more layers 110 of the IC. Each IC also contains a power grid structure that provides power and ground to each electronic and circuit component of an IC from certain ones of bumps 104. Each electronic or circuit IC component has a power pin and a ground pin that is connected to the power grid structure. Power grid structure components include stripes and rails such as interconnections 106, and vias such as 108.

In order to protect the functional modules in ICs from ESD events, protection cells (e.g. ESD clamps) are often included in the IC, generally between the functional modules of the IC and the input/output ("I/O") terminals 104 (e.g., bumps, pins, pads, etc.) of the IC. For example, for ESD protection, it is often required that for each bump 104 in the IC there exists an ESD protection cell through which its static charge can be discharged without damaging the devices. As set forth above, ESD protection cells, which like instances of other IC components can comprise one or more shapes 102 on one or more layers 110, are used to protect all of the I/O and power pins 104 from ESD events.

Figure 2:
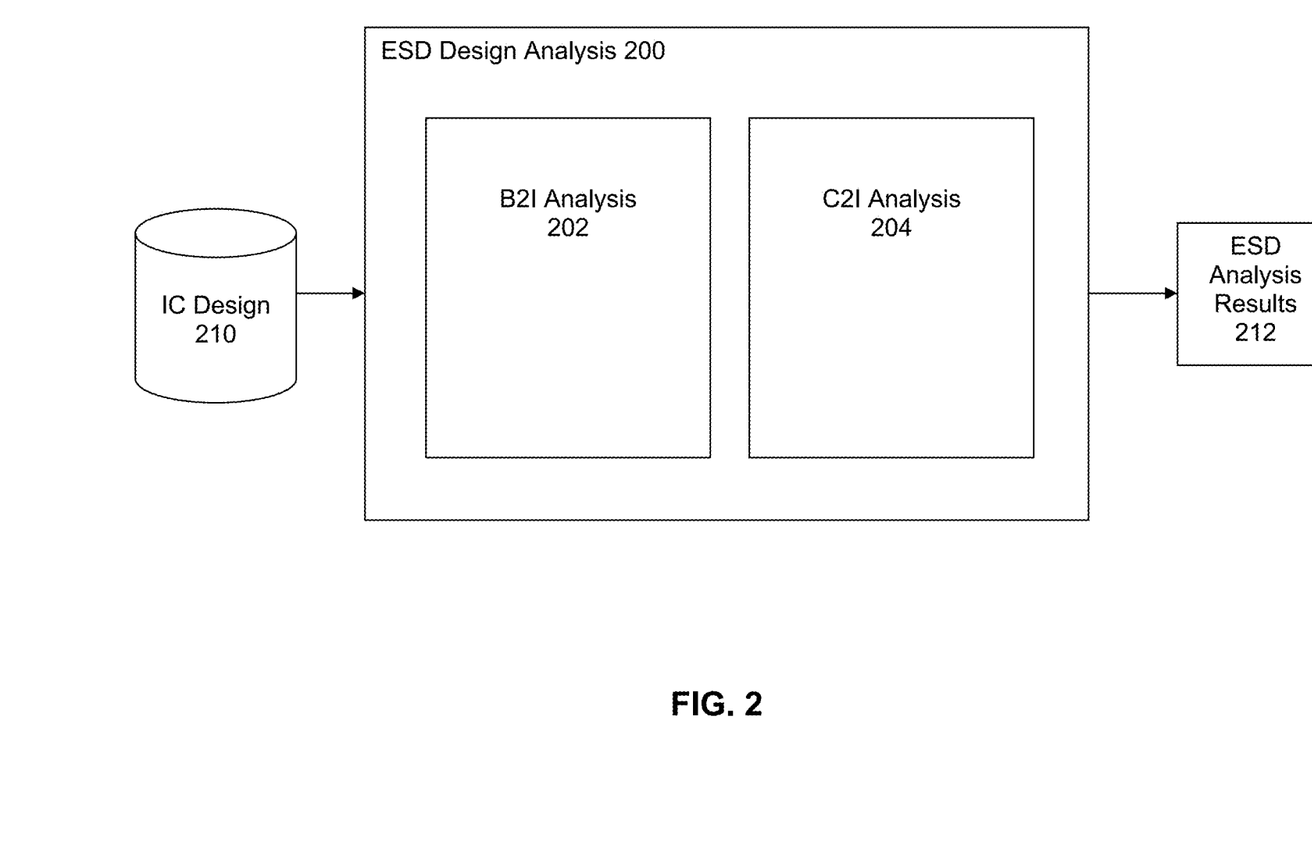
FIG. 2 is a diagram illustrating aspects of performing an ESD analysis of a design according to embodiments.

Among other things, the present applicant recognizes that during the design of the IC, to ensure that static charge on a bump 104 is discharged only through the ESD protection devices in the IC, and not through any functional instances, one or more ESD analyses of the design should be performed. FIG. 2 is a block diagram illustrating an example ESD design analysis 200 that can be performed during an IC design flow according to the present embodiments.

As shown in this example ESD design analysis 200, two ESD design robustness constraints are checked. A first design analysis 202 is sometimes referred to as a B2I analysis: (1) For each bump in the design, its effective resistance to each instance of the design should be greater than the nearest clamp to this same bump. A second design analysis 204 is sometimes referred to as C2I analysis: (2) For each instance in the design, its effective resistance to the nearest clamp should be less than a given threshold.

Design 210 can comprise a full-chip post-layout description of an integrated circuit including a description of all instances (e.g., locations and dimensions of all shapes and pins of each instance), ESD protection devices (i.e., clamps), bumps and pins in the design, and the power domains including the locations and sizes of the wires and vias that form the power grid. For example, the design 210 can include information in the form of netlists, DEF files, GDS files, lef files, technology files and cell library files.

The analysis results 212 preferably includes information that enables a designer to ensure that the risk of a damaging ESD event in a completed IC corresponding to the design 210 will not occur, to a reasonable degree of certainty. However, the present applicant recognizes that the form of the analysis results 212 can greatly impact design times and resources.

For example, to fully ensure these constraints are satisfied for every instance in a given IC design using brute force methods, one possible type of analysis results 212 would include exact values of effective resistances between every instance, bump and clamp in the design 210. Suppose a design 210 has "N" instances, "B" bumps and "C" clamps. To satisfy the first B2I constraint, it would thus be necessary to perform (B*N+B*C) effective resistance computations. To satisfy the second C2I constraint it would thus be necessary to perform C*N effective resistance computations.

The present applicants recognize several problems in connection with the conventional brute force methods. For example, in many IC designs, the number of instances (N) could be a hundred million or more, and bumps (B) and clamps (C) each usually number in the thousands. So to report all the violations deterministically it would be necessary to compute more than 100 billion effective resistances. Meanwhile, effective resistance calculations between a large number of pairs of nodes is a difficult engineering problem, requiring high computational complexity.

There are graph based search algorithms, but they only identify least resistance paths, not the effective resistance. And because of the presence of multiple alternate paths between bumps, instances and ESD cells, the resistance of the identified least resistive path will often be considerably higher than the effective resistance.

Another approach is to solve an equivalent problem, in which the components in the design are represented as a network of billions of nodes, and the problem is to find the equivalent resistance between each given set of independent pairs of nodes of the network using a transconductance matrix and associated matrix computations. Although some efficient techniques for performing these matrix computations exist, such techniques would still require performing hundreds of billions of matrix computations, which is infeasible and could take several days or more even using several different machines.

According to certain aspects, therefore, the present embodiments provide time and resource efficient methods for performing ESD design analyses, such as B2I and C2I analyses, with analysis results that still provide a reasonable amount of information needed to allow an ESD designer to complete the design of the IC. In embodiments, these analyses enable the ESD designer to identify the worst given number of potential failed instances quickly and/or report if none exists. This is because ESD designers are typically most interested in knowing which instances failed with some estimate of the effective resistance value, rather than knowing the exact effective resistance value. With such top failures reported quickly using a reasonable amount of resources, the ESD designer can focus on these failures among the many millions of instances in the design and re-analyze the design after fixing these most likely failures.

Figure 3:
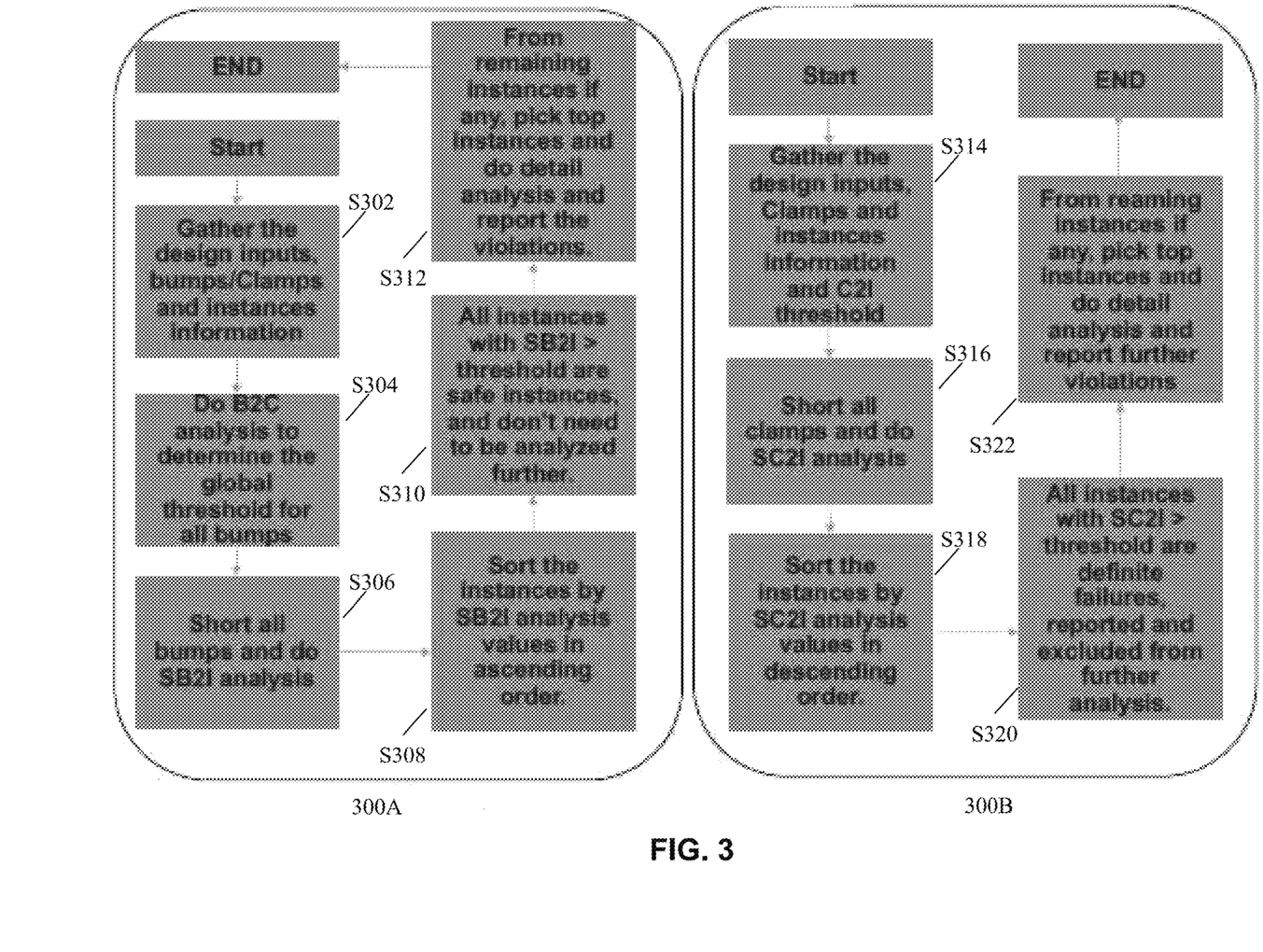
FIG. 3 illustrates an example methodology for performing an ESD analysis of an IC design so as to identifying top potential failure instances according to embodiments.

FIG. 3 is a flowchart illustrating an example methodology according to the present embodiments. As shown, this example methodology includes both a B2I analysis sub-method 300A and a C2I analysis sub-method 300B.

In a first step S302 of the example B2I analysis 300A, information regarding all the B bumps, C clamps and N instances in the design is gathered. As set forth above, the design can comprise a full-chip post-layout description of an integrated circuit in the form of netlists, DEF files, GDS files, lef files, technology files and/or cell library files. Those skilled in the art will understand how to gather the required information from such design descriptions after being taught by the present examples.

In a next step S304 of the example B2I analysis 300A, the effective resistances between each clamp and each bump are computed. This requires performing B*C effective resistance calculations, preferably using a fast-pairwise algorithm. An example of such an algorithm that can be used in the present embodiments is described in detail in U.S. Pat. No. 9,619,604, the contents of which are incorporated herein by reference in their entirety and for all purposes. From these calculated effective resistances, the minimum bump-to-clamp resistance values are determined, and these are used to set the global resistance threshold for the design.

In step S306 of the example B2I analysis 300A, all the bump nodes are shorted together (i.e. connecting zero resistances between all of the bump nodes) and the effective resistances between the shorted bump nodes to all the instances are computed. This step can include extracting the resistance only circuit net to be analyzed from the design with any single one of the bump node locations (since they are all at the same potential) and the instance pin locations as the port nodes. From these extracted nodes, the transconductance matrix G is generated. By shorting together the bump nodes, the problem of computing the effective resistances reduces to computing only the diagonal entries of a sparse inverse matrix. However, given the high number of instances N, the matrix solution described in detail in U.S. Pat. No. 9,619,604 is not feasible. Instead, the present applicant recognizes that there exist many efficient approaches to compute only the diagonal entries of a sparse inverse matrix, one of them is called the Takahashi method. The result of this inverse matrix diagonal computation are shorted bump to instance (SB2I) values between the shorted bump nodes and each instance pin in the design.

Next, in step S308 of the example B2I analysis 300A, the SB2I values for each instance are sorted in ascending order, and in step S310, for each instance the lowest SB2I values are compared to the global threshold resistance value obtained in step S304. For those instances in which the lowest, and therefore all, of the computed SB2I values are greater than the threshold, they are not considered candidates for ESD violations and can be excluded from further analysis.

In a next step S312, for those instances having SB2I values less than the threshold resistance value from step S304, these instances are flagged as potential ESD failures, denoted as N' such instances. The top min(X, N') of such instances having the lowest SB2I values are selected for a further detailed B2I analysis. Here, X can be a user specified desired top failure count (e.g. in thousands). For each of these instances an effective resistance analysis is performed between them and all the bumps in the design, which are unshorted in contrast to the analysis in step S306. The example algorithm described in detail in U.S. Pat. No. 9,619,604 can also be used for this effective resistance analysis. The result is an exact effective resistance value for each failed instance and each bump in the design.

Although shown separately from example B2I analysis 300-A, the example C2I analysis 300-B can be performed either immediately before or after B2I analysis 300-A, or it can be performed independently from B2I analysis 300-A. If performed independently, a first step S314 of the example C2I analysis 300B can include gathering information regarding all the B bumps, C clamps and N instances in the design such as that described above in connection with step S302. This step S312 of the example C2I analysis 300B can also include computing the effective resistances between each clamp and each bump if analysis 300A and analysis 300B are performed independently. This can be done similarly to the example described above in connection with step S304. Similar to step S304, the global threshold for the C2I analysis is obtained from these computed effective resistances.

In step S316 of the example C2I analysis 300B, all the clamp nodes are shorted together (i.e. connecting zero resistances between all of the nodes corresponding to the pins of all of the clamps) and the effective resistances between the shorted clamp nodes and all the instances are computed. This step can include extracting the resistance only circuit net to be analyzed from the design with any single one of the clamp node locations (since they are all at the same potential) and the instance pin locations as the port nodes. From these extracted nodes, the transconductance matrix G is generated. By shorting together the clamp nodes, the problem of computing the effective resistances reduces to computing only the diagonal entries of a sparse inverse matrix. As with the SB2I value computation, the Takahashi method may be used. The result of this inverse matrix diagonal computation are shorted clamp to instance (SC2I) values between the shorted clamp nodes and each instance pin in the design.

Next, in step S318 of the example C2I analysis 300B, the SC2I values for each instance are sorted in descending order, and in step S320, for each instance the highest SC2I values to the shorted clamps are compared to the global threshold resistance value obtained in step S312. For those instances in which the highest, and therefore all, of the computed SC2I values are lower than the threshold, they are not considered candidates for ESD violations and can be excluded from further analysis.

In a next step S322, for those instances having SC2I values greater than the threshold resistance value from step S312, these instances are flagged as potential ESD failures, denoted as N' such instances. The top min(X, N') of such instances having the highest SC2I values are selected for a further detailed C2I analysis. Here, X can be a user specified desired top failure count (e.g. in thousands). For each of these instances an effective resistance analysis is performed between them and all the clamps in the design, which are unshorted in contrast to the analysis in step S316. The example algorithm described in detail in U.S. Pat. No. 9,619,604 can also be used for this effective resistance analysis. The result is an exact effective resistance value for each failed instance and each clamp in the design.

Figure 4:
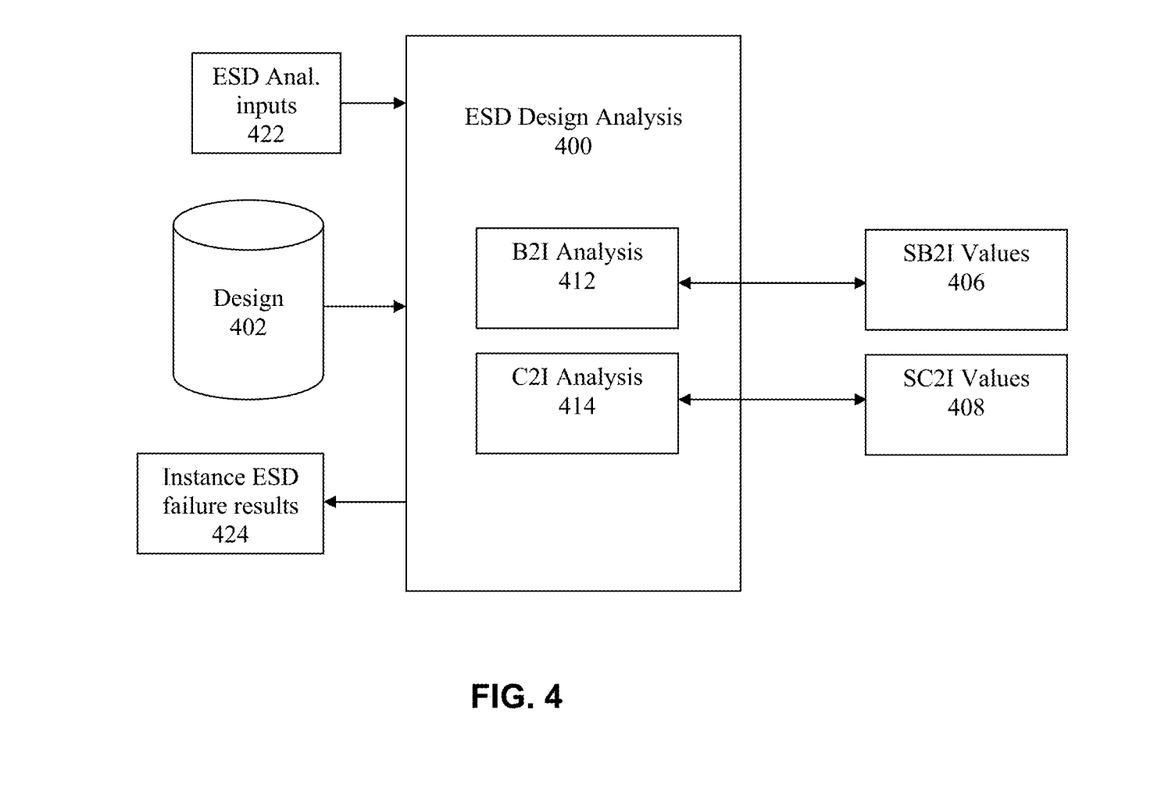
FIG. 4 is a block diagram illustrating an example system for performing an ESD analysis of an IC design according to embodiments.

FIG. 4 is a block diagram illustrating an example system according to the present embodiments. As shown in FIG. 4, this example system includes a ESD design analyzer 400. In accordance with aspects of the present embodiments, analyzer 400 implements a methodology for determining the top potential ESD failure instances for a design such as that described above in connection with FIG. 3.

As shown in this example, analyzer 400 operates on the design 402 to produce results 424 useful for identifying the top ESD failure instances in the design 402. As set forth above, design 402 can comprise full-chip post-layout description of an integrated circuit including a description of all instances (e.g., locations and dimensions of all shapes and pins of each instance), ESD protection devices (i.e., clamps), bumps and pins in the design, and the power domains including the locations and sizes of the wires and vias that form the power grid. For example, the design 402 can include information in the form of netlists, DEF files, GDS files, lef files, technology files and cell library files.

In this example, in addition to design 402, analyzer 400 receives ESD analysis inputs 422. As set forth above, this can include a user-defined minimum number of top failure instances X.

As further shown in FIG. 4, analyzer 400 includes a B2I analysis module 412 that computes SB2I values 406 for all instances and bumps in the design as described above in connection with the flowchart in FIG. 3. Similarly, analyzer 400 includes a C2I analysis module 412 that computes SC2I values 408 for all instances and claims in the design as described above in connection with the flowchart in FIG. 3. Based on one or both of these values 406, 408, analyzer 400 provides results 424, which can include a list of the top potential ESD failure instances, possibly in addition to estimated effective resistance values between the identified instances and bumps and/or clamps in the design.

It should be noted that analyzer 400 can be implemented in various ways. For example, analyzer 400 can be implemented by one or more general purpose computers that are loaded with an operating system executing software and/or customized to include hardware for performing an ESD analysis of an IC design using the functionality of the present disclosure. In some embodiments, the one or more computing systems comprise and/or communicate with various components not shown such as the processor(s) or processor core(s), memory, disks, etc. The one or more computing systems may further write to and read from a local or remote volatile or non-volatile computer accessible storage not shown that stores thereon data or information such as, but not limited to, design 402, SB2I values 406, SC2I values 408, inputs 422 and results 424, and can include one or more databases such as physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with application software for implementing some or all of the methodology of the present embodiments, and one or more client computers can communicate with the server computer(s) via a network to perform some or all of the methodology of the embodiments for a particular design. Such computing systems can further include one or more computing systems loaded with user interface functionality for providing designers with controls for initiating the performance of simulations and analyses for a particular design, providing any user-required inputs 422 and to view the results 424.

In these and other embodiments, analyzer 400 can be implemented using one or more existing electronic design automation (EDA) tools such as IC electrical analysis tools, floorplanning tools, power grid analysis and optimization tools, design implementation tools, power integrity tools, etc. Those skilled in the art will understand how to adapt such existing tools after being taught by the present disclosure. Additionally or alternatively, some or all of analyzer 400 can be implemented using standalone or other versions of the above described EDA software, and can possibly be adapted to communicate with components such as existing EDA tools.

Among many other aspects, it should be appreciated that the cost of computing effective resistances from shorted bump/clamps to all instances according to the present embodiments, is much more reasonable than computing fully detailed resistances, especially in view of the large number of instances in a full-chip design. Meanwhile, the computing cost of performing the detailed resistance analysis according to the embodiments is $\min(X,N')*(B+C)$, which can be efficiently done with the existing fast-pairwise algorithm. In some examples, $\min(X,N')$ is in the order of thousands. For example, the present applicants have been able to perform a C2I analysis as set forth above on an IC design with 78 million instances and around 4000 clamps in 14 hours, with the top 25,000 potential ESD violation instances reported using 32 CPUs.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for protecting an integrated circuit against electrostatic discharge (ESD), the method comprising:
   identifying a design of the integrated circuit (IC);
   identifying one or both of a set of bumps in the IC design and a set of ESD cells in the IC design;
   identifying a plurality of functional instances in the IC design;
   creating a shorted node in the IC design by shorting together and thereby grouping a plurality of nodes in the IC design, wherein the shorted node corresponds to either a single one of the set of bumps after zero resistances have been inserted between the set of bumps in the IC design or a single one of the set of ESD cells after zero resistances have been inserted between the set of ESD cells in the IC design;
   computing shorted effective resistance values between each respective one of the functional instances and the shorted node; and
   using the shorted effective resistance values to identify potential ESD failures among the plurality of functional instances in the IC design.

2. The method of claim 1, wherein computing the shorted effective resistance values includes:
   generating a transconductance matrix using the shorted node and nodes corresponding to the plurality of functional instances; and
   computing diagonal entries of an inverse matrix corresponding to the transconductance matrix.

3. The method of claim 1, wherein using the shorted effective resistance values to identify potential ESD failures includes:
   identifying a global threshold resistance value for the IC design; and
   comparing the shorted resistance values to the global threshold resistance value.

4. The method of claim 3, wherein the global threshold resistance value represents a minimum resistance value associated with the set of bumps and the set of ESD cells, and wherein functional instances having respective shorted effective resistance values to the set of bumps below the global threshold resistance value are identified as potential ESD failure instances.

5. The method of claim 3, wherein the global threshold resistance value represents a maximum resistance value associated with the set of bumps and the set of ESD cells, and wherein functional instances having respective shorted effective resistance values to the set of clamps greater than the global threshold resistance value are identified as potential ESD failure instances.

6. The method of claim 1, further comprising performing a detailed effective resistance analysis on certain of the identified potential ESD failure instances.

7. The method of claim 6, wherein a number of the certain identified potential failure instances is determined by a user-specified threshold.

8. A computer program product comprising a non-transitory computer readable storage medium having instructions recorded thereon which, when executed by a processor, cause the processor to perform a method for protecting an integrated circuit against electrostatic discharge (ESD), the method comprising:
   identifying a design of the integrated circuit (IC);
   identifying one or both of a set of bumps in the IC design and a set of ESD cells in the IC design;
   identifying a plurality of functional instances in the IC design;
   creating a shorted node in the IC design by shorting together and thereby grouping a plurality of nodes in the IC design, wherein the shorted node corresponds to either a single one of the set of bumps after zero resistances have been inserted between the set of bumps in the IC design or a single one of the set of ESD cells after zero resistances have been inserted between the set of ESD cells in the IC design;
   computing shorted effective resistance values between each respective one of the functional instances and the shorted node; and
   using the shorted effective resistance values to identify potential ESD failures among the plurality of functional instances in the IC design.

9. The computer program product of claim 8, wherein computing the shorted effective resistance values includes:
   generating a transconductance matrix using the shorted node and nodes corresponding to the plurality of functional instances; and
   computing diagonal entries of an inverse matrix corresponding to the transconductance matrix.

10. The computer program product of claim 8, wherein using the shorted effective resistance values to identify potential ESD failures includes:
    identifying a global threshold resistance value for the IC design; and
    comparing the shorted resistance values to the global threshold resistance value.

11. The computer program product of claim 10, wherein the global threshold resistance value represents a minimum resistance value associated with the set of bumps and the set of ESD cells, and wherein functional instances having respective shorted effective resistance values to the set of bumps below the global threshold resistance value are identified as potential ESD failure instances.

12. The computer program product of claim 10, wherein the global threshold resistance value represents a maximum resistance value associated with the set of bumps and the set of ESD cells, and wherein functional instances having respective shorted effective resistance values to the set of clamps greater than the global threshold resistance value are identified as potential ESD failure instances.

13. The computer program product of claim 8, further comprising performing a detailed effective resistance analysis on certain of the identified potential ESD failure instances.

14. The computer program product of claim 13, wherein a number of the certain identified potential failure instances is determined by a user-specified threshold.

15. A system for protecting an integrated circuit against electrostatic discharge (ESD), the system comprising:
    storage for a design of the integrated circuit (IC);
    an ESD design analysis module that is coupled to the storage and is configured to:
      identify one or both of a set of bumps in the IC design and a set of ESD cells in the IC design;
      identify a plurality of functional instances in the IC design;
      create a shorted node in the IC design by shorting together and thereby grouping a plurality of nodes in the IC design, wherein the shorted node corresponds to either a single one of the set of bumps after zero resistances have been inserted between the set of bumps in the IC design or a single one of the set of ESD cells after zero resistances have been inserted between the set of ESD cells in the IC design;
      compute shorted effective resistance values between each respective one of the functional instances and the shorted node; and
      use the shorted effective resistance values to identify potential ESD failures among the plurality of functional instances in the IC design.

16. The system of claim 15, wherein the ESD design analysis module is configured to compute the shorted effective resistance values by:
    generating a transconductance matrix using the shorted node and nodes corresponding to the plurality of functional instances; and
    computing diagonal entries of an inverse matrix corresponding to the transconductance matrix.

17. The system of claim 15, wherein the ESD design analysis module is further configured to receive a user-specified number for performing a detailed effective resistance analysis on only certain of the identified potential ESD failure instances.

18. The system of claim 15, wherein the ESD design analysis module is further configured to operate after a layout stage of the IC design.

19. The system of claim 18, wherein the IC design comprises a full chip layout of the IC.

* * * * *